US009663373B2

(12) United States Patent
Gautam et al.

(10) Patent No.: US 9,663,373 B2
(45) Date of Patent: May 30, 2017

(54) METHOD AND APPARATUS FOR PRODUCING HIGH PURITY PHOSGENE

(71) Applicant: SABIC Global Technologies B.V., Bergen op Zoom (NL)

(72) Inventors: Pankaj Singh Gautam, Evansville, IN (US); William E. Hollar, Jr., Mount Vernon, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 14/907,417

(22) PCT Filed: Jul. 25, 2014

(86) PCT No.: PCT/US2014/048261
§ 371 (c)(1),
(2) Date: Jan. 25, 2016

(87) PCT Pub. No.: WO2015/013655
PCT Pub. Date: Jan. 29, 2015

(65) Prior Publication Data
US 2016/0176715 A1 Jun. 23, 2016

Related U.S. Application Data

(60) Provisional application No. 61/858,770, filed on Jul. 26, 2013, provisional application No. 61/858,765, filed on Jul. 26, 2013, provisional application No. 61/858,761, filed on Jul. 26, 2013, provisional application No. 61/858,813, filed on Jul. 26, 2013, provisional application No. 61/858,776, filed on Jul. 26, 2013.

(51) Int. Cl.
| C01B 31/00 | (2006.01) |
| B01J 8/00 | (2006.01) |
| C01B 31/28 | (2006.01) |
| B01J 8/06 | (2006.01) |
| B01J 19/24 | (2006.01) |
| B01J 8/02 | (2006.01) |
| B01J 19/00 | (2006.01) |

(52) U.S. Cl.
CPC ............ *C01B 31/28* (2013.01); *B01J 8/0285* (2013.01); *B01J 8/067* (2013.01); *B01J 19/006* (2013.01); *B01J 19/243* (2013.01); *B01J 19/2405* (2013.01); *B01J 19/2415* (2013.01); *B01J 19/2425* (2013.01); *B01J 2208/00194* (2013.01); *B01J 2208/00212* (2013.01); *B01J 2208/00221* (2013.01); *B01J 2219/00094* (2013.01); *B01J 2219/00765* (2013.01)

(58) Field of Classification Search
CPC ................................. C01B 31/28; B01J 8/067
USPC .......................................... 562/847; 422/187
See application file for complete search history.

(56) References Cited

U.S. PATENT DOCUMENTS 3,857,680 A 12/1974 Porta et al.
4,016,190 A 4/1977 Bockmann et al.
4,697,034 A 9/1987 Janatpour et al.
4,792,620 A 12/1988 Paulik et al.
5,136,077 A 8/1992 Rand
5,167,946 A 12/1992 Mullins et al.
5,239,105 A 8/1993 Pews et al.
5,424,473 A 6/1995 Galvan et al.
5,478,961 A 12/1995 Ooms et al.
5,734,004 A 3/1998 Kuhling et al.
5,900,501 A 5/1999 Ooms et al.
6,054,107 A 4/2000 Cicha et al.
6,054,612 A 4/2000 Cicha et al.
6,348,613 B2 2/2002 Miyamoto et al.
6,399,823 B1 6/2002 Via et al.
6,410,678 B1 6/2002 Ishida et al.
6,500,984 B1 12/2002 Via et al.
6,531,623 B2 3/2003 Chrisochoou et al.
6,548,691 B2 4/2003 Alewelt et al.
6,680,400 B2 1/2004 Alewelt et al.
6,930,202 B1 8/2005 Heuser et al.
7,442,835 B2 10/2008 Keggenhoff et al.
7,771,674 B2 8/2010 Suzuta et al.
7,812,189 B2 10/2010 Fukuoka et al.
8,044,226 B2 10/2011 Fukuoka et al.

(Continued)

FOREIGN PATENT DOCUMENTS

CN 101545579 A 9/2009
CN 102001658 A 4/2011

(Continued)

OTHER PUBLICATIONS

Albanis et al.; "Theodoros Albanis and Evcoxia Kladopoulou, Hellenic Petroleum A Heat Exchanger for Texas Tower Feed/Effluent Applications Aided the Upgrade Project of the Hellenic Petroleum Refinery at Thessaloniki"; Hydrocarbon Engineering; Feb. 2.
English Abstract of CN 102001658 A; Date of Publication Apr. 6, 2011; 2 pages.
English Abstract of DE 19543678; Date of Publication May 28, 1997; 2 pages.
English Abstract of EP 0483632; Date of Publication May 6, 1992; 1 page.
English Abstract of JP 4785515 B2; Date of Publication Oct. 5, 2011; 2 pages.
English Abstract of JP 6029129 A; Date of Publication Feb. 4, 1994; 2 pages.

(Continued)

*Primary Examiner* — Sikarl Witherspoon
(74) *Attorney, Agent, or Firm* — Cantor Colburn LLP

(57) ABSTRACT

A reactor for producing phosgene, the reactor comprising: tube located in a shell and a space located between the tube and the shell; a cooling medium located in the space and a catalyst located in the tube or cooling medium located in the tube and a catalyst located in the space; a feed inlet; and a product mixture outlet; wherein the tube comprises one or more of: a mini-tube and a second tube section; a first concentric tube concentrically located in the shell; a twisted tube; an internal scaffold; and an external scaffold.

17 Claims, 9 Drawing Sheets

(56) References Cited

U.S. PATENT DOCUMENTS

| | | |
|---|---|---|
| 8,409,539 B2 | 4/2013 | Olbert et al. |
| 8,518,231 B2 | 8/2013 | Ooms et al. |
| 8,993,803 B2 | 3/2015 | Olbert et al. |
| 9,175,135 B2 | 11/2015 | Ooms et al. |
| 2002/0065432 A1 | 5/2002 | Eckert et al. |
| 2005/0014965 A1 | 1/2005 | Dahlmann et al. |
| 2009/0143619 A1 | 6/2009 | Kauth et al. |
| 2016/0207779 A1 | 7/2016 | Gautam et al. |

FOREIGN PATENT DOCUMENTS

| | | |
|---|---|---|
| DE | 19543678 A1 | 5/1997 |
| DE | 102006022629 A1 | 11/2007 |
| EP | 0251586 A2 | 1/1988 |
| EP | 0633241 A1 | 1/1995 |
| EP | 0722931 A1 | 7/1996 |
| EP | 0796819 A1 | 9/1997 |
| EP | 0936184 A2 | 8/1999 |
| EP | 1033167 A2 | 9/2000 |
| EP | 1112997 A2 | 7/2001 |
| EP | 1234845 A2 | 8/2002 |
| EP | 1633172 A2 | 3/2006 |
| EP | 1783112 A1 | 5/2007 |
| EP | 1651565 B1 | 8/2011 |
| FR | 2003931 A1 | 11/1969 |
| JP | 6029129 A | 2/1994 |
| JP | 6340408 A | 12/1994 |
| JP | 9059012 A | 3/1997 |
| JP | 4785515 B2 | 10/2011 |
| WO | 9730932 | 8/1997 |
| WO | 2012076532 A1 | 6/2012 |
| WO | 2015119981 A2 | 8/2015 |
| WO | 2015119982 A2 | 8/2015 |

OTHER PUBLICATIONS

English Abstract of JP 6340408 A; Date of Publication Dec. 13, 1994; 2 pages.

English Abstract of JP 9059012 A; Date of Publication Mar. 4, 1997; 2 pages.

International Search Report for International Application No. PCT/US2014/048261; International Filing Date: Jul. 25, 2014; Date of Mailing: Oct. 23, 2014; 5 pages.

Naphon et al.; "A review of flow and heat transfer characteristics in curved tubes"; Renewalbe and Sustainable Energy Reviews; 10 (2006); pp. 463-490.

Written Opinion of the International Search Report for International Application No. PCT/US2014/048261; International Filing Date: Jul. 25, 2014; Date of Mailing: Oct. 23, 2014; 8 pages.

Norskov et al.,"Towards the Computational Design of Solid Catalysts", Nature Chemistry; 2009, 1, pp. 37-46.

METHOD AND APPARATUS FOR PRODUCING HIGH PURITY PHOSGENE

CROSS REFERENCE TO RELATED APPLICATIONS

This application is a National Stage application of PCT/US2014/048261, filed Jul. 26, 2014, which claims the benefit of U.S. Provisional Application Nos. 61/858,770, filed Jul. 26, 2013; 61/858,765, filed Jul. 26, 2013; 61/858,761, filed Jul. 26, 2013; 61/858,813, filed Jul. 26, 2013; and 61/858,776, filed Jul. 26, 2015; all of which are incorporated by reference in their entirety herein.

BACKGROUND

Phosgene (also known as carbonyl chloride or carbonyl dichloride) finds use in the preparation of organic compounds, monomers, and polymers, such as carbonates, isocyanates, ureas, chloroformates, carbamates, polyurethanes, and polycarbonates. In one method for producing phosgene, carbon monoxide is reacted with chlorine in the presence of a carbon-comprising catalyst such as activated carbon or silicon carbide. The reaction is strongly exothermic and is usually performed in a reactor such as a multi-tubular reactor that has been designed similarly to conventional shell and tube heat exchangers.

A carbon tetrachloride by-product can result from the phosgene reaction and can be present in an amount of 50 to 300 parts per million (ppm) by volume or higher. The presence of carbon tetrachloride in the reactor can disadvantageously result in depletion of the catalyst. Furthermore, the presence of such high levels of carbon tetrachloride is disadvantageous in several applications where the level of carbon tetrachloride in phosgene needs to be less than or equal to 10 ppm by volume before use of the phosgene.

Phosgene purification to remove carbon tetrachloride can be difficult and is a significant part of capital investment and operating costs of any phosgene plant due to the costly material of construction of the purification equipment, the need for large enclosures to house said equipment, and further because the process is very energy intensive. On a global basis, the amount of byproduct carbon tetrachloride produced in commercial phosgene manufacture annually can be as much as 2 million kilograms based on phosgene production of about 4 billion kilograms.

A method to produce purified phosgene without the need for a separate purification process is therefore desirable.

BRIEF SUMMARY

Disclosed is a method of producing phosgene, the method comprising reacting carbon monoxide and chlorine in a phosgene reactor in the presence of a catalyst to produce a product composition comprising phosgene and carbon tetrachloride, wherein reacting is under conditions effective to provide carbon tetrachloride in an amount of 0 to 10 ppm by volume, based on the total volume of phosgene.

In an embodiment, a method of producing phosgene can comprise: reacting carbon monoxide and chlorine in a phosgene reactor in the presence of a catalyst to produce a final product composition comprising phosgene; wherein carbon tetrachloride is present in the final product composition in an amount of 0 to 10 ppm by volume, based on the total volume of phosgene; wherein the phosgene reactor comprises a tube, a shell, and a space located between the tube and the shell; and wherein the catalyst is disposed in the tube and a cooling medium is located in the space, or the catalyst is disposed in the space and a cooling medium is located in the tube.

In an embodiment, a reactor for producing phosgene can comprise: tube located in a shell and a space located between the tube and the shell; a cooling medium located in the space and a catalyst located in the tube or cooling medium located in the tube and a catalyst located in the space; a feed inlet; and a product mixture outlet; wherein the tube comprises one or more of: a mini-tube and a second tube section; a first concentric tube concentrically located in the shell; a twisted tube; an internal scaffold; and an external scaffold.

The above described and other features are exemplified by the following Figures, Detailed Description, and Examples.

BRIEF DESCRIPTION OF THE DRAWINGS

Refer now to the figures, which are exemplary embodiments, and wherein the like elements are numbered alike.

DETAILED DESCRIPTION

Figure 1:
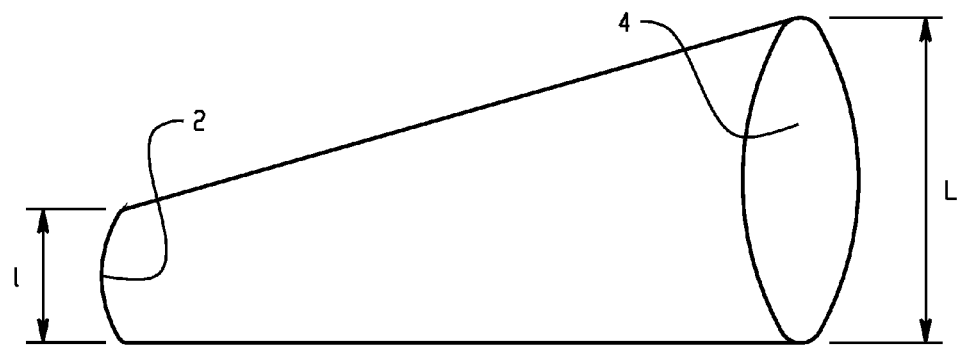
FIG. 1 is an illustration of a combined mini-tube and tube with a gradually increasing diameter.

Phosgene is typically produced in packed bed multi-tubular reactors. A typical multi-tubular reactor, e.g., for use as a phosgene reactor, consists of a shell housing a number of tubes packed with a catalyst and a cooling medium circulating between the tubes and the shell to remove the heat of the reaction. Because typical catalysts have poor thermal conductivity and the multi-tubular design is limited in terms of effective heat transfer area, the multi-tubular reactor can have high peak tube temperatures (hot spots) in the range of 400 to 800 degrees Celsius (° C.). It was surprisingly found that the formation of carbon tetrachloride is directly related to the peak reaction temperature in the packed bed, and without being bound by theory, it is believed that the formation of carbon tetrachloride primarily occurs in these hot spots. Specifically, experiments were performed in a laboratory-scale reactor where the peak reactor temperature versus the amount of carbon tetrachloride was determined, and a transfer function was developed to relate the peak reactor temperature to the amount of carbon tetrachloride ([CCl$_4$] in parts per million by volume) in the resultant phosgene. The resultant transfer function is shown in the following Equation 1.

$$\ln [CCl_4](\text{ppm}) = 0.012 T_{peak}(K) - 3.88 \quad (1)$$

Equation 1 predicts that the amount of carbon tetrachloride in the phosgene is reduced in an exponential manner as the peak temperature, $T_{peak}$ in Kelvin (K), decreases.

It was therefore surprisingly found that reducing or eliminating the formation of hot spots in the phosgene reactor such that the peak reaction temperature is less than 800° C., specifically, less than or equal to 400° C., more specifically, less than or equal to 350° C., even, more specifically, less than or equal to 300° C. could result in the formation of phosgene with less than or equal to 10 ppm, 9 ppm, 8 ppm, 7 ppm, 6 ppm, 5 ppm, 4 ppm, 3 ppm, 2 ppm, 1 ppm, or 0 ppm, by volume of carbon tetrachloride, based on the volume of phosgene. The Applicants have therefore developed a process and a phosgene reactor that can reduce or prevent formation of hot spots by increasing available heat transfer area per unit volume of the phosgene reactor. For example, a typical commercial multi-tubular phosgene reactor has an effective heat transfer area per unit volume of the order of 100 meters squared per meters cubed (m$^2$/m$^3$). At least one of the following techniques can be used to achieve high heat transfer rates to mitigate or eliminate hot spot formation that contributes to higher levels of carbon tetrachloride in phosgene: a) use of a modified reactor design greater heat transfer area per unit volume as compared with conventional multi-tubular reactors, for example, a heat transfer area per unit volume of 100 to 10,000 m$^2$/m$^3$; and b) use of a modified reactor design to increase wall contact area per unit volume to increase bed-to-reactor wall heat transfer. Each of these approaches is illustrated in the various embodiments described below.

As described above, phosgene can be prepared by the reaction of carbon monoxide and chlorine reaction gas in a phosgene reactor. It was surprisingly found that a phosgene reactor configuration that better facilitates heat removal, can result in a reduction in the concentration of carbon tetrachloride. The phosgene reactor can have a heat transfer area per unit volume of 100 to 10,000 m$^2$/m$^3$, for example, 250 to 10,000 m$^2$/m$^3$, or 500 to 10,000 m$^2$/m$^3$, or 750 to 8,000 m$^2$/m$^3$, or 1,000 to 5,000 m$^2$/m$^3$.

The phosgene reactor (also referred to as "tube reactor") can comprise any number of tubes, for example, 1 to 300, or 2 to 250, or 3 to 200, or 1 to 200 or 1 to 150, or 1 to 100 tubes located within an outer tube (also referred to as a "shell"). A cooling medium can be located between the shell and the tube(s).

The tube can comprise a mini-tube that can have an average cross-sectional diameter on the order of millimeters (mm), for example, 0.1 to 10 mm, 0.1 to 6 mm, 0.5 to 8 mm, or 0.5 to 5 mm, or 0.1 to 5 mm. The cross-sectional shape of the mini-tube(s) can be rectangular, square, round, ovoid, elliptical, multi-petal, or any other regular or irregular geometry. When the shape is not round, the "average tube cross-sectional diameter" refers to the diameter of a circle having the same area as the actual cross-sectional shape.

The tube can comprise a tube section that can have an average diameter of greater than 6 millimeters, greater than 8 millimeters, greater than 10 millimeters, or greater than 12 millimeters. The tube section can have an average diameter of less than or equal to 500 mm, less than or equal to 250 mm, less than or equal to 100 mm, or less than or equal to 50 mm.

The phosgene reactor can comprise two or more reactors in series that can be located within the same or different shell. For example, the outlet of a mini-tube (a first reactor) can feed into the inlet of a tube section with an increased diameter (a second reactor). The feed from two or more mini-tubes can be fed to the inlet of one tube section with an increased diameter. For example, a reactor (such as a MIPROWA™ reactor commercially available from Bayer Technology Services) can be located at the feed end of a middle reactor (such as a packed bed reactor) and an end reactor (such as a standard multi-tubular reactor) can be located at the outlet end of the middle reactor. Use of a mini-tube reactor can be advantageous as it can provide an order of magnitude higher heat transfer area for a given volume as compared with conventional multi-tubular reactors and hence better heat removal can be achieved. Tube reactors also have the advantage of being scalable for different size reactors, as the number of tubes, for example, mini-tubes can be increased and the effective length scale of the system, i.e., the channel size, does not have to change with scale-up.

Figure 2:
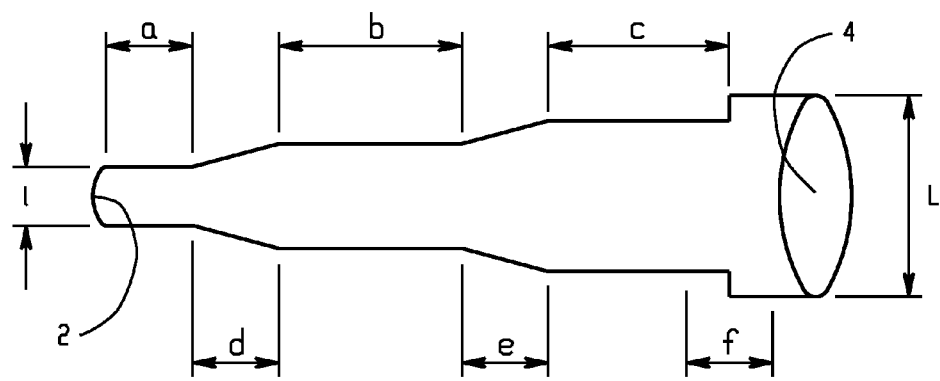
FIG. 2 is an illustration of a combined mini-tube and tube with a stepwise increasing diameter.

A mini-tube can be combined with a tube section with an increased diameter as one continuous tube having different dimensions at the feed end and the outlet end. For example, a section of the tube at the feed end can be a mini-tube having a diameter of 0.1 to 10 mm, 0.1 to 6 mm, 0.5 to 8 mm, or 0.5 to 5 mm for a first length, and a section of the tube at the outlet end can have an increased diameter of greater than 6 mm, e.g., 10 mm or greater for a second length. The increase in diameter from the mini-tube to the increased diameter tube can be gradual as shown in FIG. 1 or stepwise as shown in FIG. 2. FIG. 1 illustrates that the increase of diameter 1 from mini-tube end 2 to diameter L at tube end 4 can be gradual in that the increase in diameter from 1 to L is defined by a smooth function, for example, linear function. It is noted that mini-tube end 2 and tube end 4 could likewise be concentric. FIG. 2 illustrates that the length of each section of different diameter can differ (for example, a vs. b) or be the same (for example, b and c). Similarly the transition from one diameter to another can be gradual or abrupt (e vs. f), and of the same or different length or angle.

Figure 3:
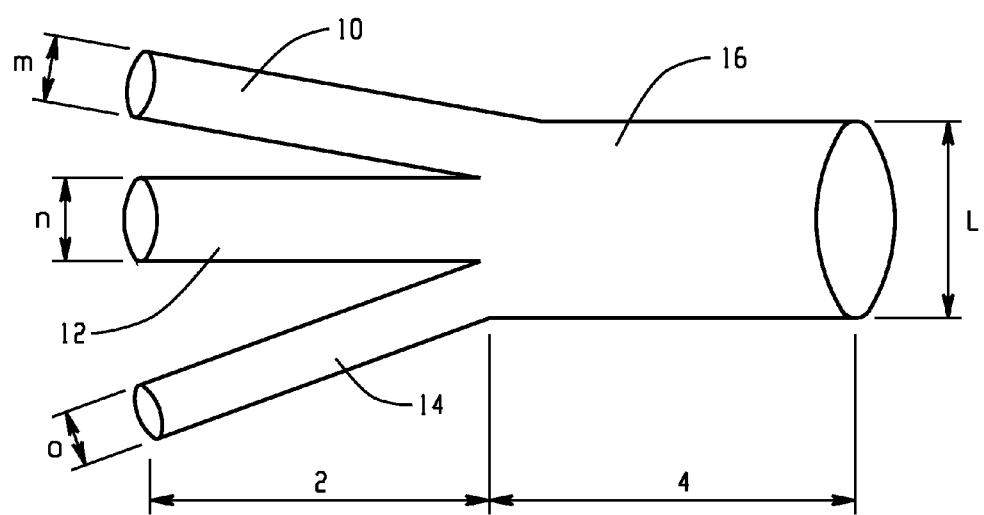
FIG. 3 is an illustration of a combined mini-tube and tube with a plurality of mini-tubes feeding into a tube.

A single mini-tube can be combined with a single tube of larger diameter as shown in FIG. 1 and FIG. 2, or a plurality of mini-tubes can be combined with a single tube of larger diameter as shown in FIG. 3. FIG. 3 illustrates that a plurality of mini-tubes 10, 12, and 14 can be present at mini-tube end 2 that can join tube 16 at tube end 4. Tubes 10, 12, and 14 can have a diameter of m, n, and o, respectively, where m, n, and o can each individually be the same or different. The combined tube(s) can be located within a shell, with a cooling medium located between the shell and the tube.

The tube can have a concentric tube configuration located within a shell, where the shell can be the outer-most tube of the reactor. The concentric tube configuration comprises at least one first, inner concentric tube with an internal diameter, $d_1$, concentrically located within a second, outer tube with a diameter $d_2$ wherein $d_2>d_1$. As used herein, the term "concentric" and "concentrically located" mean that the first, inner tube is located within the second, outer, tube, with the centerline of the first tube being substantially parallel to that of the other tube. Thus, the center line of each concentric tube may be coincident; or the centerline of the inner concentric tube may be offset from the centerline of the outer tube. As used herein "substantially parallel means that the centerline of each tube can be at a relative angle of 0° to 20°, 0° to 10°, or 0° to 5°. The centerline of each tube can be coincident, that is, overlap.

The innermost concentric tube of the reactor can have a cross-sectional diameter (where the cross-sectional diameter is the diameter of a circle with the same area as the area of the first inner tube) on the order of millimeters (mm), for example, 20 mm or greater, 40 mm or greater, 80 mm or greater, or higher, depending on the throughput of the reaction and other factors known in the art. The outer tube can be sized to accommodate the innermost tube, together with cooling medium or catalyst.

The cross-section of the first, inner concentric tube, the second, outer concentric tube, or the third concentric tube can have a rectangular, square, round, ovoid, elliptical, or any other regular or irregular geometry. The cross-section of the inner concentric tube can have a round or multi-petal geometry. As mentioned above, when the shape is not round, the "average microtube channel cross-sectional diameter" refers to the diameter of a circle having the same area as the actual cross-sectional shape. Each concentric tube can have the same or different cross-sectional geometry. For example, both the first and second concentric tubes (and any additional tubes) can have a circular cross-section, or the inner concentric tube can have a multi-petal cross-sectional geometry and the outer tube can have a circular cross-sectional geometry.

Figure 4:
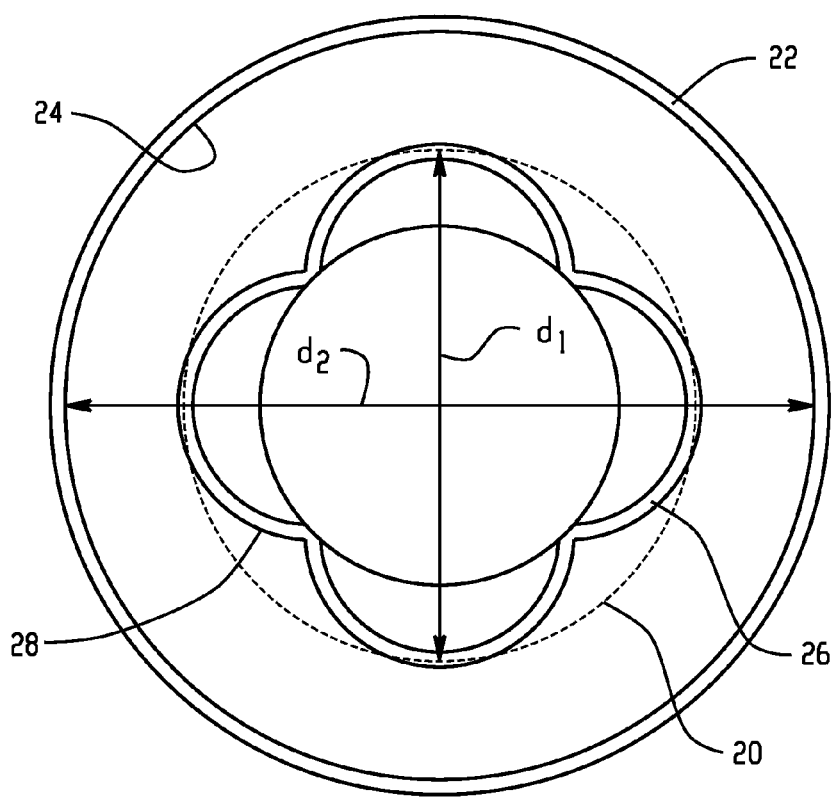
FIG. 4 is an illustration of a cross-section of a concentric tube reactor.

An example of a multi-petal geometry is illustrated in FIG. 4. Specifically, FIG. 4 illustrates a concentric tube configuration comprising a second, outer concentric tube 22 having inner diameter $d_2$ with an inner wall 24, together with a first, inner concentric tube with a four-petal geometry 26 located concentrically within the outer concentric tube 22. The first tube has an outer wall 28. The diameter of the inner concentric tube is described by the diameter, $d_1$, of the circle 20 that has the same area as the area of the first inner concentric tube with the four-petal geometry 26.

The first, inner concentric tube can be a packed bed reactor with a catalyst located therein, and the outer tube can comprise a cooling medium. In other words, the cooling medium can flow in a region located between an outer wall of the first concentric tube containing the catalyst and an inner wall of the second concentric tube.

Alternatively, the cooling medium can be located in the first, inner concentric tube, and the catalyst can be located between the outer wall of the first concentric tube and the inner wall of the second concentric tube. A plurality of each set of the concentric tubes can be located in a shell of a multi-tube reactor. Alternatively, a single set of concentric, for example, coincident, tubes can be surrounded by a third concentric tube having an inner diameter $d_3$, where $d_3>d_2>d_1$. In this embodiment, a cooling medium can be located between an outer wall of the second concentric tube and an inner wall of the third concentric tube. The three-tube embodiment can be used as a phosgene reactor, or a plurality of each set of three concentric tubes can be located in a shell of a phosgene reactor.

The concentric tube configuration can provide improved heat removal compared with a conventional multi-tubular reactor by providing a higher heat transfer area between the catalyst and the cooling medium, and hence lower peak tube temperature.

The tube can comprise a twisted tube, where one or more twisted tubes containing the catalyst are employed. The twisted tube configuration can provide improved heat removal compared with a conventional multi-tubular reactor by providing a higher heat transfer area between the catalyst and the cooling medium, and hence lower peak tube temperature. The twisted tube can have, for example, a smooth helical shape (where a tangent line at any point on an outer surface of the tube makes a constant angle with a fixed line), a jagged helical shape (where a tangent line at any point on an outer surface of the tube does not make a constant angle with a fixed line), a wavy shape, a bulging shape, or the like, or a combination comprising one or more of the foregoing.

Figure 5:
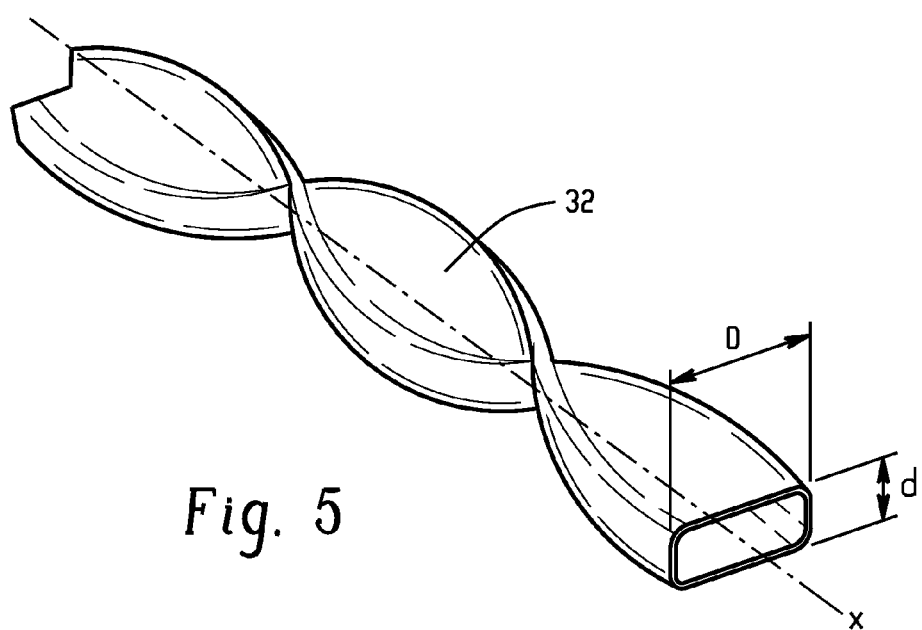
FIG. 5 is an illustration of a smooth helical twisted tube.
Figure 6:
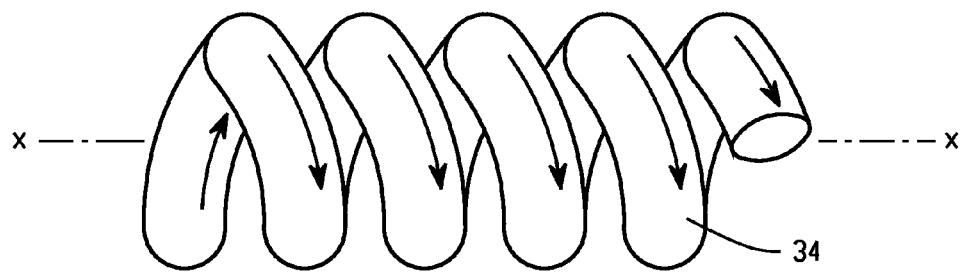
FIG. 6 is an illustration of a corkscrew twisted tube.
Figure 7:
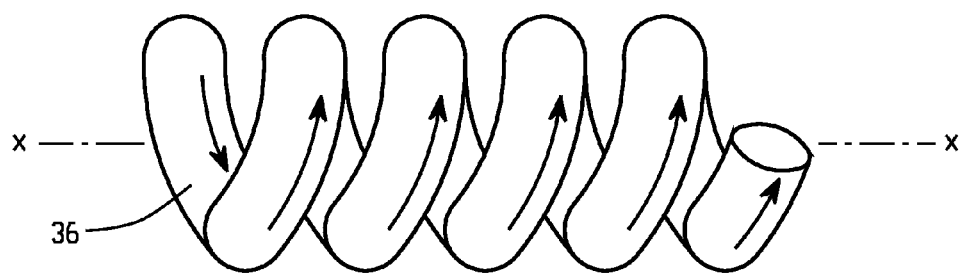
FIG. 7 is an illustration of a jagged helical twisted tube.
Figure 8:
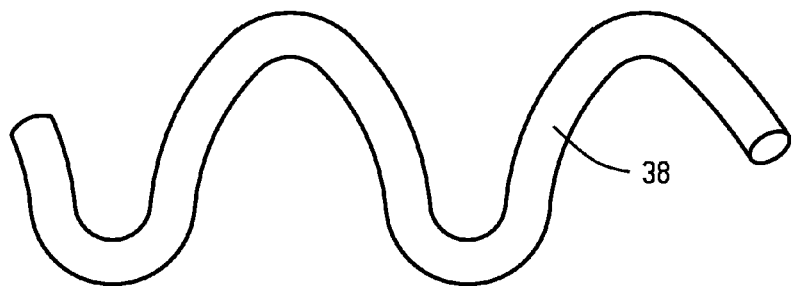
FIG. 8 is an illustration of a wavy twisted tube.
Figure 9:
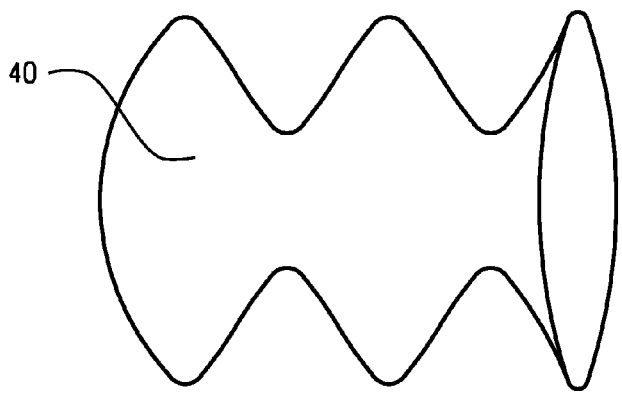
FIG. 9 is an illustration of a bulging twisted tube.

FIG. 5 is an illustration of smooth helical twisted tube 32 that is twisting on axis x. FIG. 6 is an illustration of corkscrew twisted tube 34 that is twisting around axis x. FIG. 7 is an illustration of jagged helical twisted tube 36 that is twisting on axis x. It is noted that while jagged helical twisted tube 36 is illustrated to maintain rotation around center axis x, it could likewise deviate from the axis. FIG. 8 is an illustration of wavy twisted tube 38. FIG. 9 is an illustration of bulging twisted tube 40.

Figure 10:
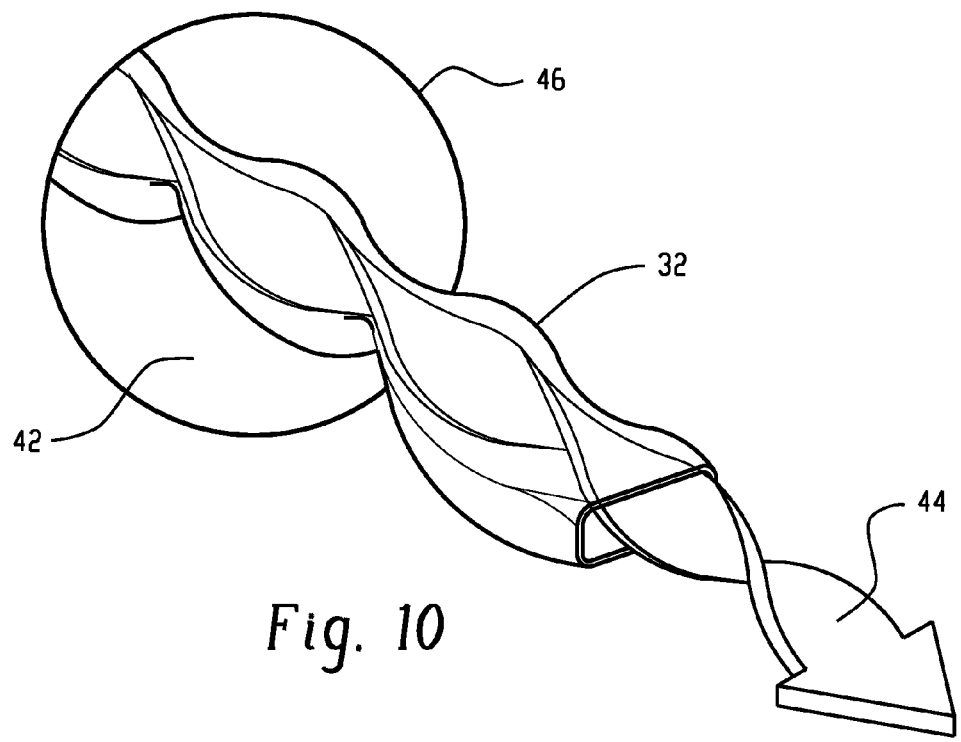
FIG. 10 is an illustration of a tubeside flow of a twisted tube reactor.
Figure 11:
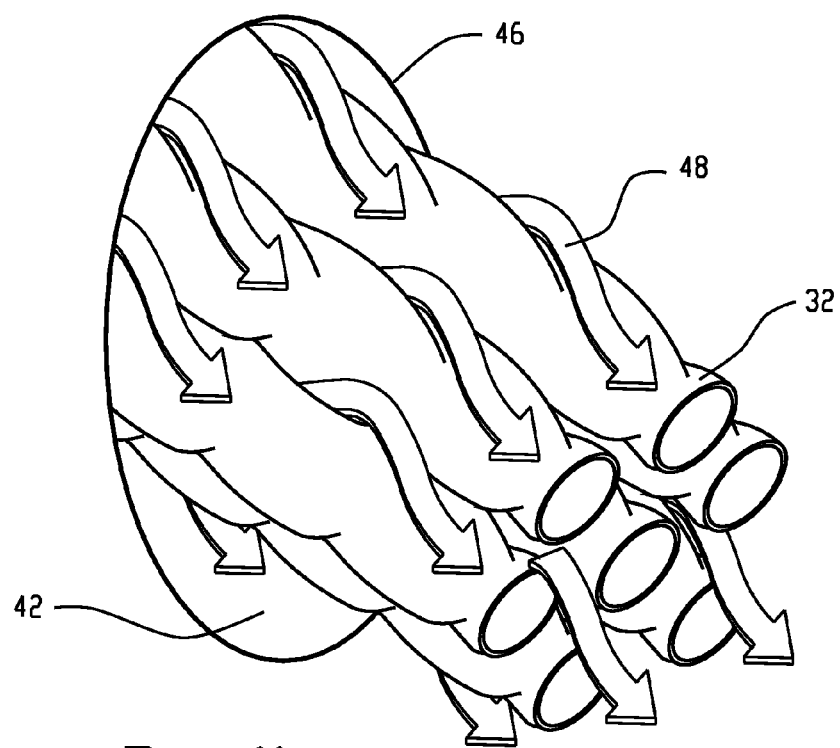
FIG. 11 is an illustration of a shellside flow of a twisted tube reactor.
Figure 12:
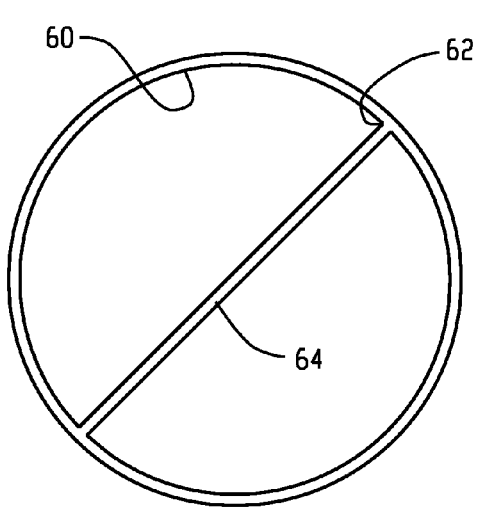
FIGS. 12 to 19 are illustrations of various internal scaffoldings.
Figure 13:
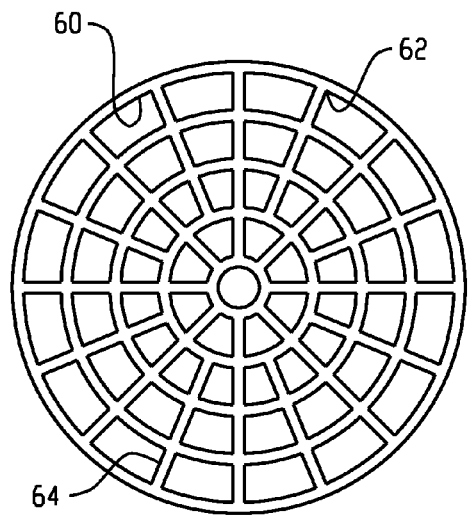
Figure 14:
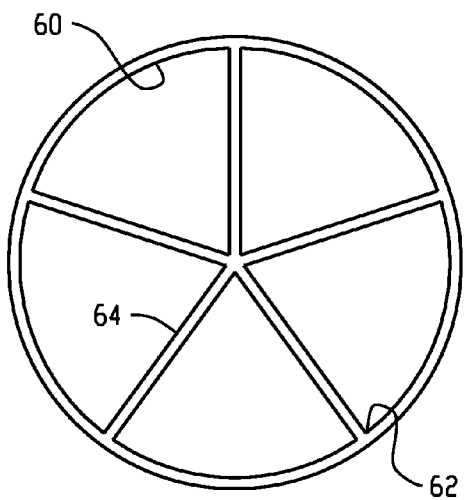
Figure 15:
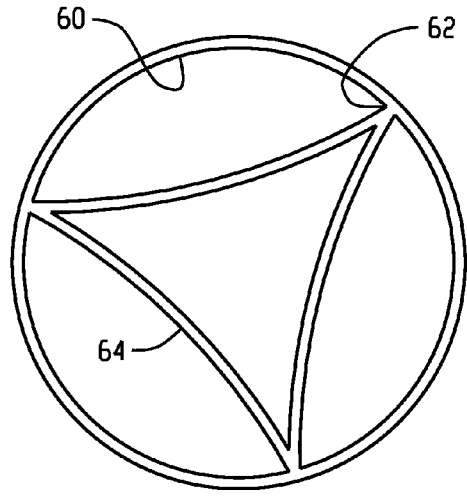

FIG. 10 is an illustration of a single smooth helical twisted tube 32 located in outer shell 46. Cooling medium can flow in the opening (also referred to herein as the area or the space) 42 between outer shell 46 and smooth helical twisted tube 32. Arrow 44 illustrates the improved tube-side flow that arises within the twisted tube. FIG. 11 is an illustration of a plurality of smooth helical twisted tubes 32 located in outer shell 46. Cooling medium can flow in the opening 42 between outer shell 46 and smooth helical twisted tube 32. Arrow 48 illustrates the improved shell-side flow that arises in the opening.

The twisted tube can be configured to provide an improved tubeside flow as shown in FIG. 10 and/or a shell-side flow as shown in FIG. 11. Without being bound by theory, it is believed that the twisted tube configuration can lower internal and external resistance to heat transfer by enhancing turbulence both within twisted tube and within the larger surrounding shell. An example of a twisted tube that can be used is the tube in the Twisted Tube™ heat exchanger commercially available from Koch Heat Transfer Company.

Any combination of the above-described twisted tube configurations can be used, including a combination with a tube having a different cross-sectional configuration.

The shape of the cross-section of each twisted tube independently can be, for example, circular or non-circular (such as ovoid, multi-petal, elliptical, or rectangular (for example, with rounded edges), or any other regular or irregular geometry), where the cross-section can change orientation and/or shape with distance along the twisted tube. The cross-section can be circular, in the twisted tube configurations.

Each twisted tube of the reactor independently can have an average cross-sectional diameter on the order of millimeters (mm), for example, 20 mm or greater, 40 mm or greater, 80 mm or greater, or higher. Each twisted tube of the reactor independently can have major diameter and a minor diameter that can be measured via a center point of the cross-section as the longest diameter and the shortest diameter, respectively. The major diameter and the minor diameter can be on the order of millimeters (mm), for example, 20 mm or greater, specifically, 40 mm or greater, specifically, or 80 mm or greater, and the major diameter can be larger than the minor diameter. The major diameter and the minor diameter can each independently be greater than or equal to 5 mm, specifically, 20 to 1,000 mm, more specifically, 40 to 500 mm, even more specifically, 80 to 150 mm. A ratio of the major diameter to the minor diameter can be 1:1 to 20:1, specifically, 1.1:1 to 10:1, more specifically, 2:1 to 5:1. FIG. 5 illustrates an example of major diameter D and minor diameter d of smooth helical twisted tube 32.

The tube can be modified to comprise internal scaffolding. For example, one or more of a tube of a conventional multi-tubular reactor, a mini-tube, a concentric tube, and a twisted tube can be modified to comprise internal scaffolding. The internal scaffolding can be in the form of one or both of internal inserts and internal fins that can function to increase the contact area between the tube and the catalyst in order to enhance heat transfer. The internal inserts are internally located inserts that can be in direct contact with an inner wall of a tube and can be loosely connected thereto. The internal fins are fins that are internally extended surfaces that are integral to the tube design, where, for example, the fins can be welded thereon or can be formed during the forming of the tube itself. The internal scaffolding can act to expose more of the catalyst particles to direct contact with the inner tube inner wall, which can facilitate heat transfer to the cooling medium.

Figure 16:
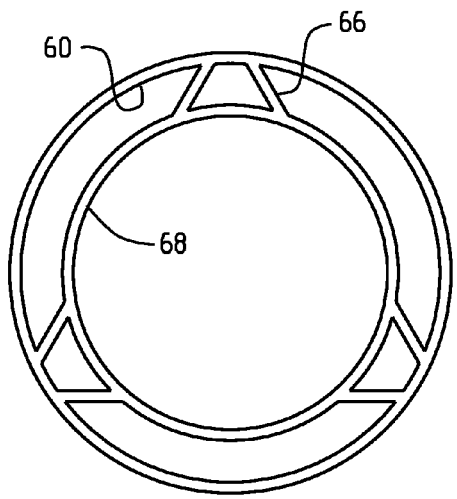
Figure 17:
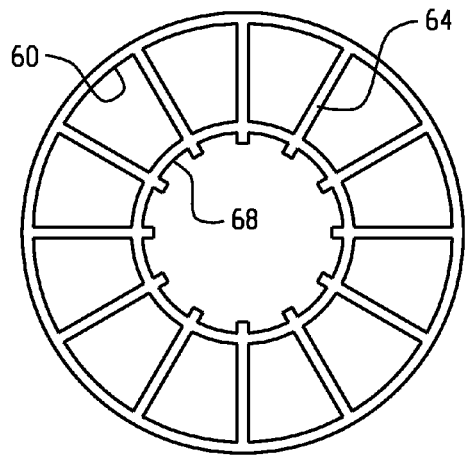
Figure 18:
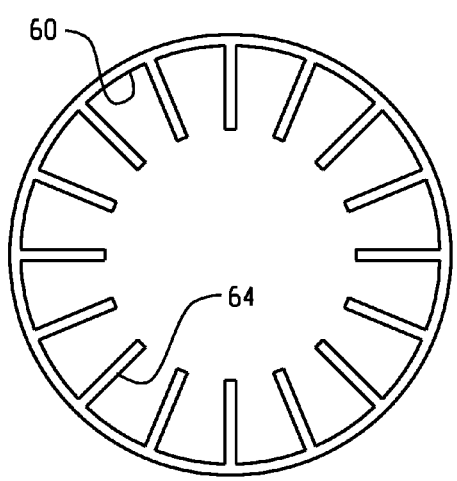
Figure 19:
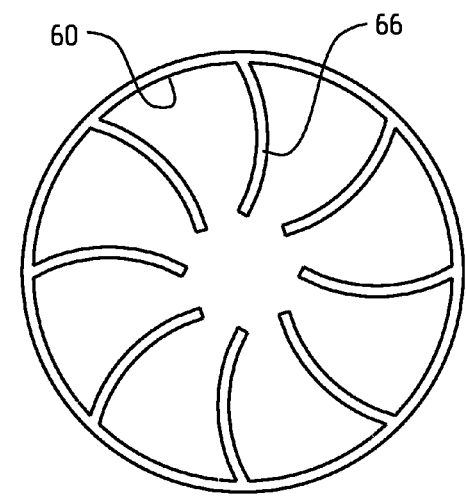

The internal scaffolding can comprise internal scaffolding elements that can be, for example, curved, wavy, or straight that can have various shapes and lengths. The internal scaffolding element can comprise a perpendicular element 64, an inner element, an angled element, or a combination comprising one or more of the foregoing. Some examples of internal scaffoldings that can be in direct contact with or can be integrally attached to the inner tube inner wall 60 are shown in the inner tube cross-sections illustrated in FIGS. 12-19. For example, the internal scaffolding can comprise a perpendicular element 64, where at least one element end is perpendicular to a line tangent to the contact point 62 of the inner tube inner wall 60 (see FIGS. 12-15, 17, and 18). The internal scaffolding can comprise an inner element 68, where the inner element 68 does not come in direct contact with the inner tube inner wall 60 (see FIGS. 16 and 17). The internal scaffolding can comprise an angled element 66, where at least one end of the angled element is at a non-ninety degree angle to a line tangent to the inner tube inner wall (see FIGS. 16 and 19).

The tube can be modified to comprise external scaffolding. For example, one or more of a tube of a conventional multi-tubular reactor, a mini-tube, a concentric tube, and a twisted tube can be modified to comprise external scaffolding. The external scaffolding can be in the form of one or both of external inserts and external fins that can function to further enhance the heat transfer from inner tube externally to cooling fluid. The external inserts are located between the outer wall of a first tube and the inner wall of a second tube, or the outer wall of a second tube and an inner wall of a third tube. The external inserts can be in direct contact with the outer wall and can optionally be loosely connected thereto. The external fins are fins that are externally extended surfaces that can be integral to the tube design, where, for example, the fins can be welded thereon or can be formed during the forming of the tube itself.

Figure 20:
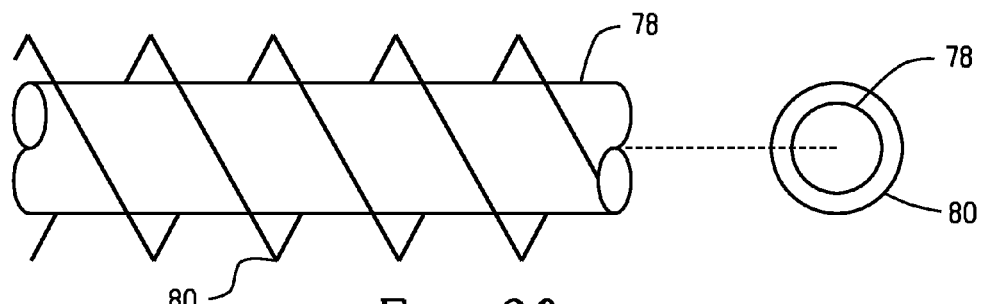
FIG. 20 is an illustration of an external scaffolding helical element.
Figure 21:
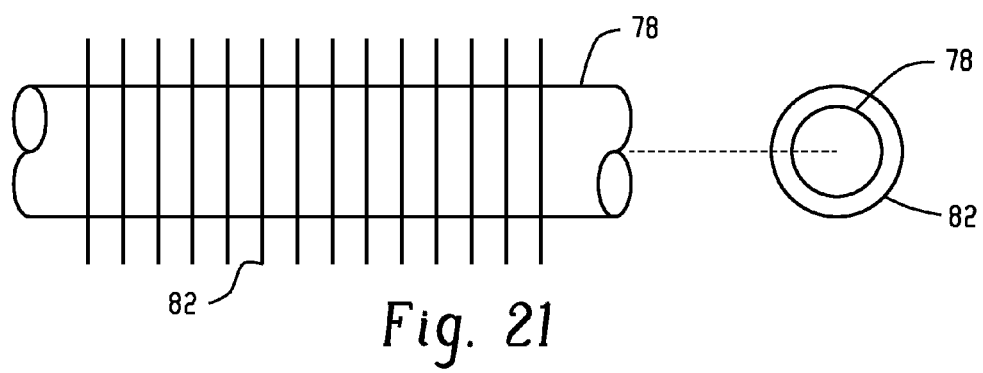
FIG. 21 is an illustration of an external scaffolding annular element.
Figure 22:
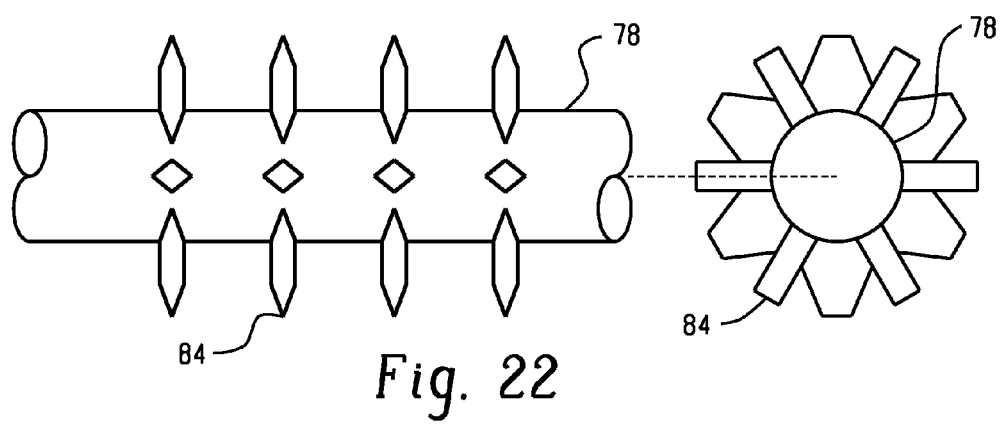
FIG. 22 is an illustration of an external scaffolding studded element.
Figure 23:
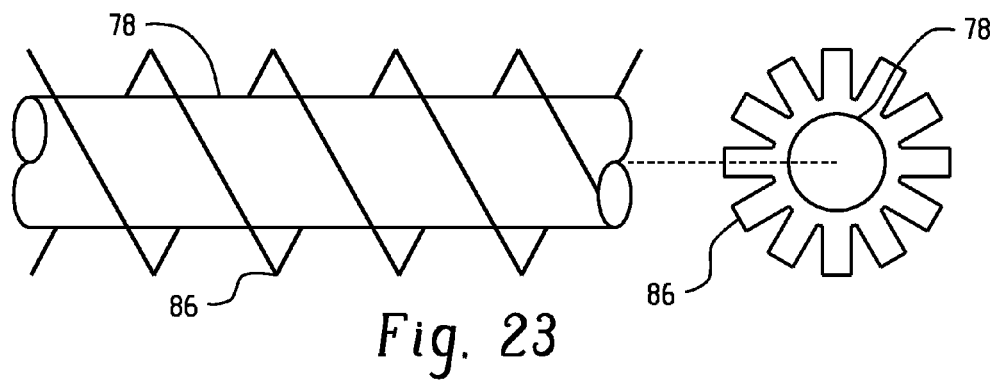
FIG. 23 is an illustration of an external scaffolding serrated element.
Figure 24:
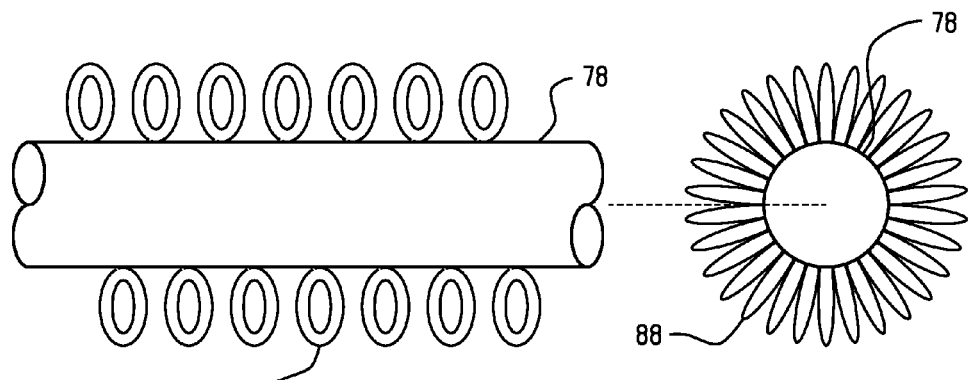
FIG. 24 is an illustration of an external scaffolding wire element.
Figure 25:
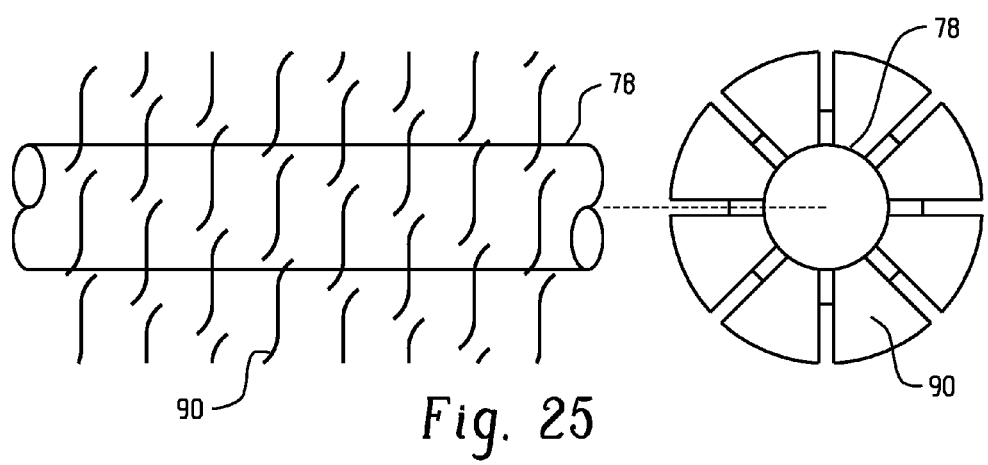
FIG. 25 is an illustration of an external scaffolding cut helical element.
Figure 26:
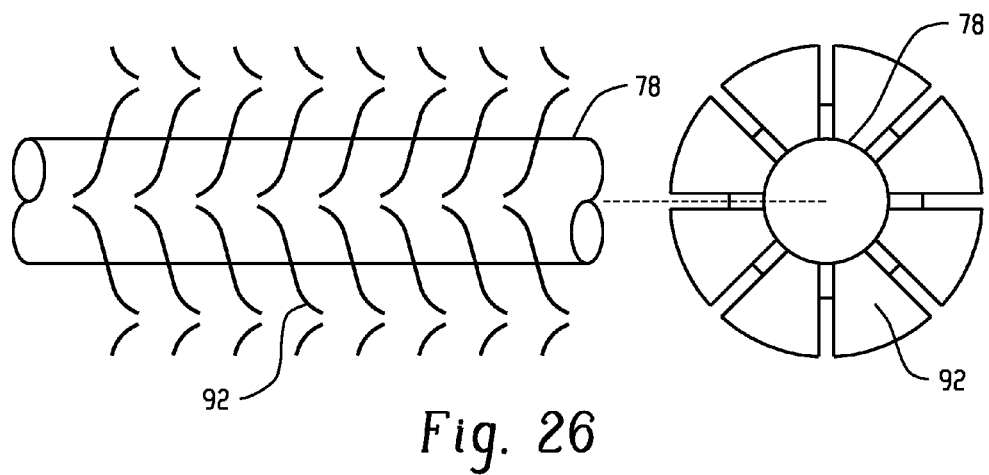
FIG. 26 is an illustration of an external scaffolding cut annular element.
Figure 27:
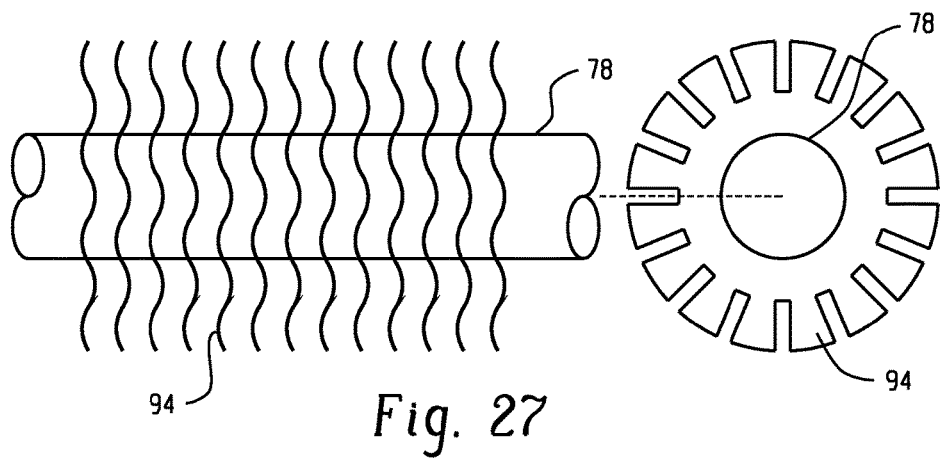
FIG. 27 is an illustration of an external scaffolding wavy helical element.
Figure 28:
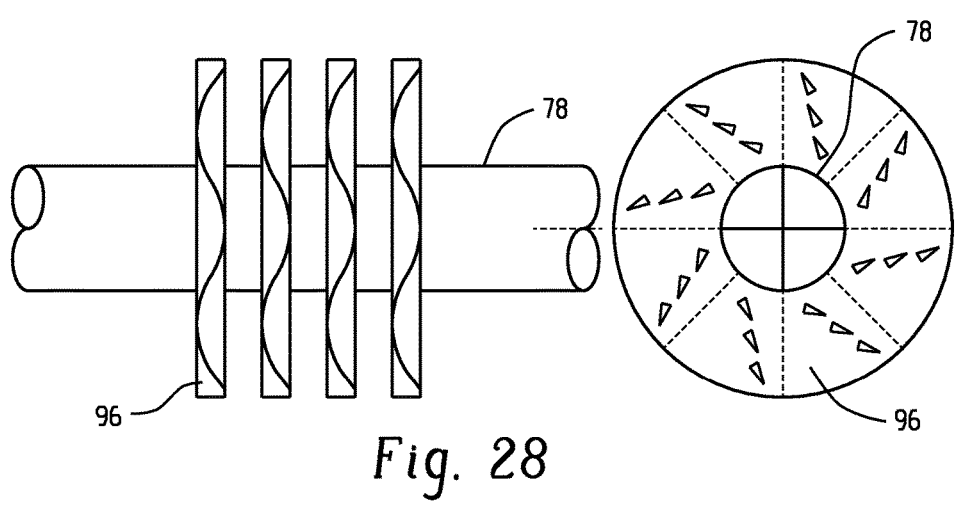
FIG. 28 is an illustration of an external scaffolding slotted wavy helical element.
Figure 29:
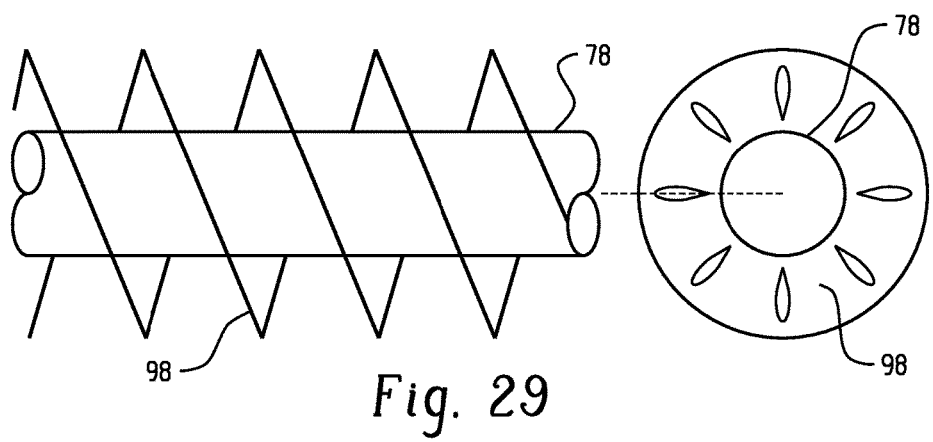
FIG. 29 is an illustration of an external scaffolding slotted helical element.

The external scaffolding can comprise external scaffolding elements that can be, for example, curved, wavy, or straight and can have various shapes and lengths. Some examples of external scaffoldings that can be in direct contact with or that can be integrally attached to the inner tube outer wall 78 are shown in FIGS. 20 to 29, where the images on the left are embodiments of side view images of an inner tube with a surrounding external scaffolding and the images on the right are embodiments of cross-sectional or top down views of the inner tube and with similar external scaffolding. Specifically, FIG. 20 illustrates that the external scaffolding can comprise a helical element 80 that is helically located on the outer wall 78 of the inner tube. FIG. 21 illustrates that the external scaffolding can comprise an annular element 82. FIG. 22 illustrates that the external scaffolding can comprise a studded element 84. FIG. 23 illustrates that the external scaffolding can comprise a serrated element 86. FIG. 24 illustrates that the external scaffolding can comprise a wire element 88. FIG. 25 illustrates that the external scaffolding can comprise a cut helical element 90. FIG. 26 illustrates that the external scaffolding can comprise a cut annular element 92. FIG. 27 illustrates that the external scaffolding can comprise a wavy helical element 94. FIG. 28 illustrates that the external scaffolding can comprise a slotted wavy helical element 96. FIG. 29 illustrates that the external scaffolding can comprise a slotted helical element 98.

It was further found that the location of the catalyst in the reactor can significantly affect the heat transfer from the reaction to the cooling liquid. Specifically, the catalyst can be deposited on (i.e., can be in direct contact with) a wall of reactor tube, for example, an inner wall of a mini-tube, a twisted tube, a concentric tube, or a combination comprising one or more of the foregoing. The deposited catalyst can be used in combination with a packed bed. The catalyst can be disposed in the tube as a packed bed. However, better heat transfer can be obtained where the deposited catalyst is the only catalyst used in the reaction to produce phosgene. The fact that the catalyst can be deposited on a tube or channel wall instead of being packed within the tubes or channels can result in a reduction in plugging. Without being bound by theory, it is believed that the deposited catalyst can facilitate heat removal from the reactor because the catalyst particles are in direct contact with the reactor wall rather than primarily in contact with each other.

Deposited catalyst can be used in any of the above reactor and tube configurations, and further can be used in a conventional multi-tubular reactor. Thus, catalyst can be deposited on the inner surfaces of the tubes of a multi-tube reactor. The catalyst can be deposited on the surfaces of the channels of a microtube reactor. The catalyst can be deposited, for example, by coating. The catalyst can be deposited to completely cover the intended surface, or deposited in a pattern. For example, less catalyst can be deposited at the feed end of the tube, and more catalyst deposited at the outlet end.

A variety of different catalysts that facilitate the reaction between carbon monoxide and chlorine can be used in the above-described methods and reactors. The catalyst can be a carbon-comprising catalyst such as activated charcoal. The carbon can be from, for example, wood, peat, coal, coconut shells, bones, lignite, petroleum-based residues, sugar, and the like, or a combination comprising one or more of the foregoing. The carbon catalyst can be in particulate forms such as powder, granules, pellets, and the like, or a combination comprising one or more of the foregoing. The carbon surface area as determined by Brunauer-Emmett-Teller (BET) measurement can be greater than or equal to 100 square meters per gram (m$^2$/g), specifically, greater than or equal to 300 m$^2$/g, more specifically, greater than or equal to 1,000 m$^2$/g. The carbon surface area as determined by BET measurement can be 100 to 2,000 m$^2$/g, specifically, 550 to 1,000 m$^2$/g. Examples of commercially available carbon catalysts include Barnebey Sutcliffe™, Darco™, Nuchar™ Columbia JXN™, Columbia LCK™, Calgon PCB™, Calgon BPL™, Westvaco™, Norit™, and Barnebey Cheny NB™.

The catalyst can be an oxidatively stable catalyst. "Oxidatively stable" means that the catalyst loses less than or equal to 12 wt % when sequentially heated in air for the following times and temperatures; 125° C. for 30 minutes, 200° C. for 30 minutes, 300° C. for 30 minutes, 350° C. for 45 minutes, 400° C. for 45 minutes, 450° C. for 45 minutes, and finally at 500° C. for 30 minutes. This sequence of time and temperature conditions for evaluating the effect of heating carbon samples in air can be run using thermal gravimetric analysis (TGA).

The catalyst can comprise an active metal content of less than or equal to 1,000 ppm by weight. The active metal can comprise one or more transition metals of Groups 3 to 10 of the Periodic Table, boron, aluminum, silicon, or a combination comprising one or more of the foregoing. The catalyst can be free of iron, where free of iron can mean that the catalyst comprises less than or equal to 100 ppm by weight, specifically, 0 to 50 ppm by weight of iron. Likewise, the catalyst can comprise less than or equal to 200 ppm by weight, specifically, less than or equal 100 ppm by weight of sulfur and/or less than or equal to 200 ppm by weight, specifically, less than or equal 100 ppm by weight of phosphorus. Carbon catalysts that comprise less than or equal to 1,000 ppm of active metals can be obtained by acid washing (for example, carbons that have been treated with hydrochloric acid or hydrochloric acid followed by hydrofluoric acid).

The catalyst can be a composite carbon comprising a porous carbonaceous material with a three dimensional matrix obtained by introducing gaseous or vaporous carbon-containing compounds (for example, hydrocarbons) into a mass of granules of a carbonaceous material (for example, carbon black); decomposing the carbon-containing compounds to deposit carbon on the surface of the granules; and treating the resulting material with an activator gas comprising steam to provide the porous carbonaceous material. A carbon-carbon composite material is thus formed, which is suitable as a catalyst. Such porous carbon-carbon composites can have a surface area as determined by BET measurement of greater than or equal to 10 m$^2$/g, and can include (1) a micropore to macropore ratio of less than or equal to 3.5, specifically, less than or equal to 2.0, more specifically, less than or equal to 1.0, even more specifically, 0 to 1.0; and (2) a loss of less than or equal to 16% of its weight, specifically, less than or equal to 10% of its weight, more specifically, less than or equal to 5% of its weight when sequentially heated in air for the following times and temperatures: 125° C. for 30 minutes, 200° C. for 30 minutes, 300° C. for 30 minutes, 350° C. for 45 minutes, 400° C. for 45 minutes, 450° C. for 45 minutes, and finally at 500° C. for 30 minutes. Such a catalyst can comprise an active metal content greater than or equal to 1,000 ppm. The sequence of time and temperature conditions for evaluating the effect of heating carbon samples in air can be run using TGA. The term "micropore" means a pore size of less than or equal to 20 angstroms (Å) and the term "macropore" means a pore size of greater than 20 Å. The total pore volume and the pore volume distribution can be determined, for example, by porosimetry. The micropore volume (centimeters cubed per gram (cc/g)) can be subtracted from the total pore volume (cc/g) to determine the macropore volume. The ratio of micropores to macropores can then be calculated. Examples of commercially available porous carbons include Calgon X-BCP™ and Calsicat™.

The catalyst can comprise a silicon carbide catalyst. The silicon carbide catalyst can have a surface area as determined by BET measurement of greater than or equal to 10 square meters per gram (m$^2$/g), specifically, greater than or equal 20 m$^2$/g, more specifically, greater than or equal to 100 m$^2$/g, more specifically, greater than or equal to 300 m$^2$/g. The silicon content can be less than or equal to 10 wt %, specifically, less than or equal to 5 wt %. The silicon carbide catalyst can be manufactured using, for example, a process that comprises contacting silicon monoxide with finely divided carbon (such as one comprising an ash content of less than or equal to 0.1 wt %) or by reacting vapors of silicon monoxide (SiO) with carbon.

The reactor can comprise one or more catalyst zones. As described briefly above, when the catalyst is deposited on a surface of a tube, the tube can comprise a first catalyst zone located at or toward the feed end that comprises less catalyst. The tube can further comprise a second catalyst zone located at or toward the outlet end that can comprise the same or different catalyst, at a higher concentration than the first catalyst. The two catalyst zones can be sequentially located. Alternatively, the deposition can be gradually increased so that catalyst concentration forms a smooth (for example, a linear or a non-linear gradient) or step gradient along each catalyst zone, with the lower activity being present at the beginning of the first catalyst zone and the higher activity being located at the second catalyst zone.

Alternatively, or in addition, a combination of lower activity catalyst and higher activity catalyst in the packed bed can be used, as described in U.S. Pat. No. 6,500,984. For example, the reactor can comprise a first catalyst zone located at or toward the feed end that comprises a first catalyst having a first activity. The reactor can further comprise a second catalyst zone located at or toward the outlet end that can comprise the same or different catalyst, having a second activity higher than the activity of the first catalyst. The two catalyst zones can be sequentially located. Alternatively, at least a portion of the first catalyst can be intermixed with the second catalyst, such that the activity of the catalyst forms a smooth or step gradient along each catalyst zone, with the lower activity being present at the beginning of the first catalyst zone and the higher activity being located at the second catalyst zone.

As described in KR1998700231A, the reactor can comprise a first catalyst zone located in the feed end that comprises a catalyst diluted with inert filler that does not itself react under the reaction conditions and that does not catalyze or otherwise inhibit the phosgene synthesis reaction. The reactor can further comprise a second catalyst zone located at the outlet end that can comprise the same or different catalyst, which is diluted with less inert filler than in the first catalyst zone. Likewise, the reactor can comprise a first catalyst zone that contains catalyst diluted with inert filler and a second catalyst zone that contains the same or different catalyst that is not diluted with inert filler. The inert filler can be evenly distributed among catalyst particles and the two catalyst zones can be sequentially loaded with catalyst containing inert filler in a first catalyst zone followed by catalyst in a second catalyst zone containing less inert filler. Alternatively, inert filler can be distributed in a gradient among catalyst particles in each catalyst zone with the highest concentration of inert filler being present at the beginning of a first catalyst zone and the concentration of inert filler gradually decreasing until the lowest concentration of inert filler is attained at an end of a second catalyst zone. The inert filler can be distributed in a gradient among catalyst particles in a first catalyst zone with the highest concentration of inert filler being present at the beginning of a first catalyst zone and the concentration of inert filler gradually decreasing until the lowest concentration of inert filler is attained at an end of a first catalyst zone, and the second catalyst zone contains no inert filler. A proportion of catalyst near the outlet or exit point of product gases from a catalyst bed can be undiluted with inert filler, while any remaining portion of catalyst nearer the initial point of contact of catalyst with reactant gases can be diluted with inert filler. Those skilled in the art will realize that the distribution of any filler in any catalyst zone can be homogeneous or in a gradient or somewhere in-between, for example, in a step gradient.

The inert filler can comprise a low porosity material, such as a ceramic, graphite, glassy carbon, glass, quartz, a metal, or a combination comprising one or more of the foregoing. The material can have a porosity of less than or equal to 0.8 pore volume per volume of material (vol/vol), less than or equal to 0.6 vol/vol, or 0.1 to 0.5 vol/vol, for example, 0.4 vol/vol. Suitable metals comprise those that are not reactive under the reaction conditions and more specifically that are not reactive toward chlorine, carbon monoxide, or phosgene under the reaction conditions. For example, inert metal fillers can comprise stainless steel; titanium; nickel; metal alloys, including, but not limited to, nickel alloys comprising iron and chromium (such as INCONEL™), or nickel alloys comprising molybdenum and chromium (such as HASTELLOY™); or a combination comprising one or more of the foregoing. Suitable inert fillers are at least substantially inert in that they do not themselves react at an appreciable rate under the reaction conditions and do not catalyze or otherwise inhibit the phosgene synthesis reaction. Substantially inert in the present context means that a filler does not produce a level of byproducts that is outside a specification range for phosgene product.

The carbon monoxide and the chlorine gas used to prepare the phosgene can be high purity grades. The carbon monoxide can be supplied from an on-site generating plant and can comprise trace amounts of impurities such as hydrogen, methane, volatile sulfur compounds, and nitrogen. Recycled carbon monoxide recovered from a phosgene product stream can also be employed as part of the carbon monoxide-comprising feed stream.

The carbon monoxide and the chlorine can be introduced to the reactor in an equimolar amount or in a molar excess of chlorine. For example, the molar ratio of carbon monoxide to chlorine can be 1.00:1 to 1.25:1, specifically, 1.01 to 1.20:1, more specifically, 1.01:1 to 1.21:1, even more specifically, 1.02:1 to 1.12:1, still more specifically, 1.02:1 to 1.06:1.

The initial feed to the reactor can comprise all of the carbon monoxide and all of the chlorine reactants. Likewise, all of the chlorine can be added, where a first amount of carbon monoxide can be introduced to a first stage reaction zone and a second amount of carbon monoxide can be introduced to at least one downstream reaction zone. At least one downstream reaction zone can be in serial communicating relationship with the first reaction zone and the initial molar ratio of carbon monoxide to chlorine can be less than one, specifically, 0.999:1 to 0.2:1, more specifically, 0.999:1 to 0.5:1, even more specifically, 0.999:1 to 0.8:1, more specifically, 0.999:1 to 0.95:1, more specifically, 0.999:1 to 0.98:1.

The reactor can comprise a corrosion resistant material or can be lined with a corrosion resistant material. A corrosion resistant material is one that is essentially inert to chlorine, carbon monoxide, and phosgene (such as ceramic, stainless steel, titanium, nickel, or metal alloys, including, but not limited to, nickel alloys comprising iron and chromium (such as INCONEL), or nickel alloys comprising molybdenum and chromium (such as HASTELLOY)).

The phosgene produced by this method can be used in a variety of industrial processes, for example, the manufacture of polycarbonates, ureas, carbamates, and the like.

In the polymerization of a polycarbonate, a dihydroxy compound can be used as a reactant with phosgene as a carbonate source (also referred to as a carbonate precursor). "Polycarbonate" as used herein means a homopolymer or copolymer having repeating structural carbonate units of formula (1)

wherein at least 60 percent of the total number of IV groups are aromatic, or each $R^1$ contains at least one $C_{6-30}$ aromatic group. Specifically, each $R^1$ can be derived from a dihydroxy compound such as an aromatic dihydroxy compound of formula (2) or a bisphenol of formula (3).

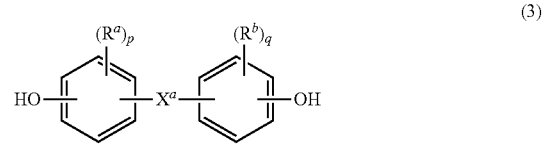

In formula (2), each $R^h$ is independently a halogen atom, for example, bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{1-12}$ alkoxy, or $C_{1-12}$ alkyl; and p and q are each independently integers of 0 to 4, such that when p or q is less than 4, the valence of each carbon of the ring is filled by hydrogen. In an embodiment, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —$C(R^c)(R^d)$— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —$C(=R^e)$— wherein $R^e$ is a divalent $C_{1-12}$ hydrocarbon group.

Some illustrative examples of specific dihydroxy compounds include the following: bisphenol compounds such as 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl) sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

Specific dihydroxy compounds include resorcinol, 2,2-bis (4-hydroxyphenyl) propane ("bisphenol A" or "BPA", in which each of $A^1$ and $A^2$ is p-phenylene and $Y^1$ is isopropylidene in formula (3)), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane (DMBPC), and 1,1-bis(4-hydroxy-3-methylphenyl)-3,3,5-trimethylcyclohexane (isophorone bisphenol).

"Polycarbonates" as used herein include homopolycarbonates (wherein each $R^1$ in the polymer is the same), copolymers comprising different $R^1$ moieties in the carbonate ("copolycarbonates"), copolymers comprising carbonate units and other types of polymer units, such as polysiloxane units, ester units, and the like.

The polycarbonate can be made by an interfacial polymerization process or in a melt polymerization process, which can be a continuous melt process. Although the reaction conditions for interfacial polymerization can vary, an exemplary process generally involves dissolving or dispersing a dihydric phenol reactant in aqueous NaOH or KOH, adding the resulting mixture to a water-immiscible solvent medium, and contacting the reactants with a carbonate precursor in the presence of a catalyst such as, for example, a tertiary amine or a phase transfer catalyst, under controlled pH conditions, e.g., 8 to 10. The water immiscible solvent can be, for example, methylene chloride, ethylene dichloride, 1,2-dichloroethane, chlorobenzene, toluene, and the like.

Among tertiary amines that can be used in interfacial polymerization are aliphatic tertiary amines such as triethylamine and tributylamine, cycloaliphatic tertiary amines such as N,N-diethyl-cyclohexylamine, and aromatic tertiary amines such as N,N-dimethylaniline. Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Examples of phase transfer catalysts include $(CH_3(CH_2)_3)_4NX$, $(CH_3(CH_2)_3)_4PX$, $(CH_3(CH_2)_5)_4NX$, $(CH_3(CH_2)_6)_4NX$, $(CH_3(CH_2)_4)_4NX$, $CH_3(CH_3(CH_2)_3)_3NX$, and $CH_3(CH_3(CH_2)_2)_3NX$, wherein X is Cl$^-$, Br$^-$, a $C_{1-8}$ alkoxy group or a $C_{6-18}$ aryloxy group. An effective amount of a phase transfer catalyst can be 0.1 to 10 weight percent (wt %), or 0.5 to 2 wt %, each based on the weight of bisphenol in the phosgenation mixture.

Phosgene can also be used in the synthesis of carbamates and ureas, which can be synthesized by reaction of phosgene with two amines or an amine and an alcohol. Such compounds can be a compound of the formula:

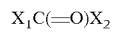

wherein $X_1$ is $NR_1R_2$ and $X_2$ is $NR_3R_4$ or $OR_5$, and wherein $R_1$, $R_2$ and $R_3$ and $R_4$, if present, are each independently hydrogen, optionally-substituted linear or branched alkyl, alkene, cycloalkyl, cycloalkenyl, aryl, heteroatom-containing aryl, and aralkyl groups, or $R_1$ and $R_2$ in combination are a carbon atom double bonded to the nitrogen of $X_1$ or $R_3$ and $R_4$ in combination are a carbon atom double bonded to the nitrogen of $X_2$ or the N of $X_1$ or $X_2$ may be the nitrogen of a ring system, and $R_5$, if present, is selected from the group consisting of optionally-substituted linear or branched alkyl, aryl, and aralkyl groups, or $R_1$ or $R_2$ in combination with $R_3$, $R_4$, or $R_5$ form a five or six-member ring. As is known in the art, the compounds can be synthesized by reacting $HNR_1R_2$, and $HNR_3R_4$ or $HOR_5$ with an ester-substituted diaryl carbonate to form the compound under transesterification conditions. The optional substituents can each independently be chemical functional groups that are not reactive under the transesterification conditions used to prepare the further derivatized carbamate species. Such optional substituents include halogen, vinyl, carbonyl, ether, cycloether, azo, sulfide/thio, alcohol, and heterocyclic substituents. The ester-substituted diaryl carbonate can be bismethylsalicylcarbonate (BMSC). The compound can be subjected to a pyrolysis reaction to form an isocyanate.

Set forth below are some embodiments of the method of producing phosgene and the reactors disclosed herein.

Embodiment 1

A method of producing phosgene, comprising: reacting carbon monoxide and chlorine in a phosgene reactor in the presence of a catalyst to produce a final product composition comprising phosgene; wherein carbon tetrachloride is present in the final product composition in an amount of 0 to 10 ppm by volume, based on the total volume of phosgene; wherein the phosgene reactor comprises a tube, a shell, and a space located between the tube and the shell; and wherein the catalyst is disposed in the tube and a cooling medium is located in the space, or the catalyst is disposed in the space and a cooling medium is located in the tube.

Embodiment 2

The method of Embodiment 1, wherein the tube comprises a mini-tube section comprising a mini-tube and a second tube section and wherein the reacting comprises: passing a feed comprising carbon monoxide and chlorine over the catalyst in the mini-tube section to produce a first product composition, wherein the mini-tube has an average diameter of 0.1 to 10 millimeters; and passing at least a portion of the first product composition over the catalyst disposed in the second tube section, wherein the second tube section comprises an increased diameter tube with an average diameter greater than the mini-tube, to produce the final product composition.

Embodiment 3

The method of Embodiment 2, wherein the average diameter of the increased diameter tube is greater than 6 millimeters.

Embodiment 4

The method of any of Embodiments 2-3, wherein the average diameter of the increased diameter tube is or greater than 10 millimeters.

Embodiment 5

The method of any of Embodiments 2-4, wherein the average diameter of the mini-tube is 0.1 to 6 millimeters.

Embodiment 6

The method of any of Embodiments 2-5, wherein the average diameter of the mini-tube is 0.1 to 5 millimeters.

Embodiment 7

The method of any of Embodiments 2-6, wherein the mini-tube section comprises a plurality of the mini-tubes.

Embodiment 8

The method of any of Embodiments 1-7, wherein the tube comprises a first concentric tube concentrically located in the shell.

Embodiment 9

The method of Embodiment 8, wherein the first concentric tube has a multi-petal cross-sectional geometry.

Embodiment 10

The method of any of Embodiments 8-9, wherein the shell has a circular cross-sectional geometry.

Embodiment 11

The method of any of Embodiments 8-10, further comprising a second concentric tube, wherein the first concentric tube and the second concentric tube are located within the shell, and a cooling medium is located between an outer wall of the second tube and an inner wall of the shell.

Embodiment 12

The method of any of Embodiments 1-11, wherein the tube comprises a twisted tube.

Embodiment 13

The method of Embodiment 12, wherein the twisted tube has a major diameter and a minor diameter and wherein a ratio of the major diameter to the minor diameter is 1:1 to 20:1, preferably greater than 1:1 to 20:1, more preferably 5:1 to 20:1.

Embodiment 14

The method of any of Embodiments 12-13, wherein the twisted tube has a major diameter and a minor diameter and wherein the major diameter and the minor diameter are each independently greater than or equal to 5 mm.

Embodiment 15

The method of any of Embodiments 12-15, wherein the twisted tube has a smooth helical shape, a jagged helical shape, a wavy shape, a bulging shape, or a combination comprising one or more of the forgoing.

Embodiment 16

The method of any of Embodiments 1-15, wherein the tube comprises an internal scaffold.

Embodiment 17

The method of Embodiment 16, wherein the internal scaffold comprises one or both of an internal insert and an internal fin.

Embodiment 18

The method of Embodiment 17, wherein the internal insert, the internal fin, or both comprises an internal scaffolding element, wherein the internal scaffolding element comprises a perpendicular element, an inner element, an angled element, or a combination comprising one or more of the foregoing.

Embodiment 19

The method of any of Embodiments 16-18, wherein the catalyst is disposed on the internal scaffolding.

Embodiment 20

The method of any of Embodiments 1-19, wherein the tube comprises an external scaffold.

Embodiment 21

The method of Embodiment 20, wherein the external scaffold comprises one or both of an external insert and an external fin.

Embodiment 22

The method of Embodiment 21, wherein the external insert, the external fin, or both comprises an external scaffolding element and wherein the external scaffolding element comprises a helical element, an annular element, a studded element, a serrated element, a wire element, a cut helical element, a cut annular element, a wavy helical element, a slotted wavy helical element, a slotted helical element, or a combination comprising one or more of the foregoing.

Embodiment 23

The method of any of Embodiments 20-22, wherein the catalyst is disposed on the external scaffold.

Embodiment 24

The method of any of Embodiments 1-23, wherein the catalyst is disposed on an inner wall of the tube.

Embodiment 25

The method of any of Embodiments 1-24, wherein the catalyst is disposed in the tube as a packed bed.

Embodiment 26

The method on any of Embodiments 1-25, wherein the cooling medium is located in the space.

Embodiment 27

The method of any of Embodiments 1-25, wherein catalyst is disposed in the space and the cooling medium is located in the tube.

Embodiment 28

The method of any of Embodiments 1-27, wherein the catalyst varies in concentration, activity, or both from a feed end of the tube to an outlet end of the tube and wherein the variance is from low activity, concentration, or both at the feed end to a higher activity, concentration, or both, at the outlet end.

Embodiment 29

The method of Embodiment 28, wherein the variance is a smooth gradient.

Embodiment 30

The method of any of Embodiments 1-29, wherein a peak temperature in the phosgene reactor is less than 800° C.

Embodiment 31

The method of Embodiment 30, wherein the peak temperature is less than 400° C.

Embodiment 32

The method of any of Embodiments 1-31, wherein the phosgene reactor has a heat transfer area per unit volume of 100 to 10,000 $m^2/m^3$.

Embodiment 33

The method of Embodiment 32, wherein the heat transfer area per unit volume is 250 to 10,000 $m^2/m^3$.

Embodiment 34

A reactor for producing phosgene, the reactor comprising: tube located in a shell and a space located between the tube and the shell; a cooling medium located in the space and a catalyst located in the tube or cooling medium located in the tube and a catalyst located in the space; a feed inlet; and a product mixture outlet; wherein the tube comprises one or more of a mini-tube and a second tube section; a first concentric tube concentrically located in the shell; a twisted tube; an internal scaffold; and an external scaffold.

Embodiment 35

The reactor of Embodiment 34, wherein the tube comprises a mini-tube section comprising the mini-tube and the second tube section; wherein the mini-tube has an average diameter of 0.1 to 10 millimeters; and wherein the second tube section comprises an increased diameter tube with an average diameter greater than the mini-tube.

Embodiment 36

The reactor of Embodiment 35, wherein the average diameter of the increased diameter tube is greater than 6 millimeters.

Embodiment 37

The reactor of Embodiment 36, wherein the average diameter of the increased diameter tube is or greater than 10 millimeters.

Embodiment 38

The reactor of any of Embodiments 34-37, wherein the average diameter of the mini-tube is 0.1 to 6 millimeters.

Embodiment 39

The reactor of any of Embodiments 34-38, wherein the average diameter of the mini-tube is 0.1 to 5 millimeters.

Embodiment 40

The reactor of any of Embodiments 34-39, wherein the mini-tube comprises a plurality of the mini-tubes.

Embodiment 41

The reactor of any of Embodiments 34-30, wherein the tube comprises the first concentric tube concentrically located in the shell.

Embodiment 42

The reactor of any of Embodiments 34-41, wherein the first concentric tube has a multi-petal cross-sectional geometry.

Embodiment 43

The reactor of any of Embodiments 34-42, wherein the shell has a circular cross-sectional geometry.

Embodiment 44

The reactor of any of Embodiments 34-43, wherein the tube comprises the first concentric tube and further comprises a second concentric tube, wherein the first concentric tube and the second concentric tube are located within the shell, and a cooling medium is located between an outer wall of the second tube and an inner wall of the shell.

Embodiment 45

The reactor of any of Embodiments 34-44, wherein the tube comprises the twisted tube.

Embodiment 46

The reactor of any of Embodiments 34-45, wherein the twisted tube has a major diameter and a minor diameter and a ratio of the major diameter to the minor diameter is 1:1 to 20:1, preferably greater than 1:1 to 20:1, more preferably 5:1 to 20:1.

Embodiment 47

The reactor of any of Embodiments 34-46, wherein the twisted tube has a major diameter and a minor diameter and wherein the major diameter and the minor diameter are each independently greater than or equal to 5 mm.

Embodiment 48

The reactor of any of Embodiments 34-47, wherein the twisted tube has a smooth helical shape, a jagged helical shape, a wavy shape, a bulging shape, or a combination comprising one or more of the forgoing.

Embodiment 49

The reactor of any of Embodiments 34-48, wherein the tube comprises the internal scaffold.

Embodiment 50

The reactor of any of Embodiments 34-49, wherein the internal scaffold comprises one or both of an internal insert and an internal fin.

Embodiment 51

The reactor of Embodiment 50, wherein the internal insert, the internal fin, or both comprises an internal scaffolding element, wherein the internal scaffolding element comprises a perpendicular element, an inner element, an angled element, or a combination comprising one or more of the foregoing.

Embodiment 52

The reactor of any of Embodiments 34-51, wherein the catalyst is disposed on the internal scaffolding.

Embodiment 53

The reactor of any of Embodiments 34-52, wherein the tube comprises the external scaffold.

Embodiment 54

The reactor of Embodiment 53, wherein the external scaffold comprises one or both of an external insert and an external fin.

Embodiment 55

The reactor of Embodiment 54, wherein the external insert, the external fin, or both comprises an external scaffolding element and wherein the external scaffolding element comprises a helical element, an annular element, a studded element, a serrated element, a wire element, a cut helical element, a cut annular element, a wavy helical element, a slotted wavy helical element, a slotted helical element, or a combination comprising one or more of the foregoing.

Embodiment 56

The reactor of any of Embodiments 34-55, wherein the catalyst is disposed on the external scaffolding.

Embodiment 57

The reactor of any of Embodiments 34-56, wherein the catalyst is disposed on an inner wall of the tube.

Embodiment 58

The reactor of any of Embodiments 34-57, wherein the catalyst is disposed in the tube as a packed bed.

Embodiment 59

The reactor of any of Embodiments 34-58, wherein the cooling medium is located in the space.

Embodiment 60

The reactor of any of Embodiments 34-59, wherein catalyst is disposed in the space and the cooling medium is located in the tube.

Embodiment 61

The reactor of any of Embodiments 34-60, wherein the catalyst varies in concentration, activity, or both from a feed end of the tube to an outlet end of the tube and wherein the variance is from low activity, concentration, or both at the feed end to a higher activity, concentration, or both, at the outlet end.

Embodiment 62

The reactor of Embodiment 61, wherein the variance is a smooth gradient.

Embodiment 63

The reactor of any of Embodiments 34-62, wherein a peak temperature in the phosgene reactor is less than 800° C.

Embodiment 64

The reactor of Embodiment 63, wherein the peak temperature is less than 400° C.

Embodiment 65

The reactor of any of Embodiments 34-64, wherein the phosgene reactor has a heat transfer area per unit volume of 100 to 10,000 m$^2$/m$^3$.

Embodiment 66

The reactor of Embodiment 65, wherein the heat transfer area per unit volume is 250 to 10,000 m$^2$/m$^3$.

Embodiment 67

The reactor of any of Embodiments 34-66, wherein the cooling medium is a liquid.

Embodiment 68

The reactor of Embodiment 67, wherein the cooling medium is water, glycol, or a combination thereof Embodiment 69

The method of any of Embodiments 1-33, wherein the cooling medium is a liquid.

Embodiment 70

The method of Embodiment 69, wherein the cooling medium is water, glycol, or a combination thereof In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). "Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or" unless otherwise indicated herein or clearly contradicted by context. Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements can be combined in any suitable manner in the various embodiments.

All references cited herein are incorporated herein by reference in their entirety.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A method of producing phosgene, comprising:
    reacting carbon monoxide and chlorine in a phosgene reactor in the presence of a catalyst to produce a final product composition comprising phosgene;
    wherein carbon tetrachloride is present in the final product composition in an amount of 0 to 10 ppm by volume, based on the total volume of phosgene;
    wherein the phosgene reactor comprises a tube, a shell, and a space located between the tube and the shell; wherein a peak temperature in the phosgene reactor is less than 800° C.; and
    wherein the catalyst is disposed in the tube and a cooling medium is located in the space, or the catalyst is disposed in the space and a cooling medium is located in the tube;
    wherein the tube comprises at least one of
        a first concentric tube having a multi-petal cross-sectional geometry concentrically located in the shell;
        a twisted tube;
        an internal scaffold;
        an external scaffold;
        the catalyst being disposed on an inner wall of the tube; and
        a mini-tube and a second tube section;
    wherein when the tube comprises the mini-tube section then the reacting comprises passing a feed comprising carbon monoxide and chlorine over the catalyst in the mini-tube section to produce a first product composition, wherein the mini-tube has an average diameter of 0.1 to 10 millimeters; and passing at least a portion of the first product composition over the catalyst disposed in the second tube section, wherein the second tube section comprises an increased diameter tube with an average diameter greater than the mini-tube, to produce the final product composition.

2. The method of claim 1, wherein the peak temperature is less than 400° C.

3. The method of claim 1, wherein the phosgene reactor has a heat transfer area per unit volume of 100 to 10,000 m$^2$/m$^3$.

4. A reactor for producing phosgene, the reactor comprising:
    a tube located in a shell and a space located between the tube and the shell;
    a cooling medium located in the space and a catalyst located in the tube or cooling medium located in the tube and a catalyst located in the space;
    a feed inlet; and
    a product mixture outlet;

wherein the tube comprises one or more of
- a mini-tube and a second tube section, wherein the mini-tube has an average diameter of 0.1 to 10 millimeters; and wherein the second tube section comprises an increased diameter tube with an average diameter greater than the mini-tube;
- a first concentric tube concentrically located in the shell;
- a twisted tube;
- an internal scaffold; and
- an external scaffold.

5. The reactor of claim 4, wherein the average diameter of the increased diameter tube is greater than 6 millimeters.

6. The reactor of claim 4, wherein the tube comprises the first concentric tube concentrically located in the shell.

7. The reactor of claim 4, wherein the first concentric tube has a multi-petal cross-sectional geometry.

8. The reactor of claim 4, wherein the tube comprises the first concentric tube and further comprises a second concentric tube, wherein the first concentric tube and the second concentric tube are located within the shell, and a cooling medium is located between an outer wall of the second tube and an inner wall of the shell.

9. The reactor of claim 4, wherein the tube comprises the twisted tube, and wherein the twisted tube has a major diameter and a minor diameter and a ratio of the major diameter to the minor diameter is 1:1 to 20:1.

10. The reactor of claim 4, wherein the twisted tube has a major diameter and a minor diameter and wherein the major diameter and the minor diameter are each independently greater than or equal to 5 mm.

11. The reactor of claim 4, wherein the twisted tube has a smooth helical shape, a jagged helical shape, a wavy shape, a bulging shape, or a combination comprising one or more of the forgoing.

12. The reactor of claim 4, wherein the tube comprises the internal scaffold, and wherein the internal scaffold comprises one or both of an internal insert and an internal fin.

13. The reactor of claim 12, wherein the internal insert, the internal fin, or both comprises an internal scaffolding element, wherein the internal scaffolding element comprises a perpendicular element, an inner element, an angled element, or a combination comprising one or more of the foregoing.

14. The reactor of claim 4, wherein the tube comprises the external scaffold, and wherein the external scaffold comprises one or both of an external insert and an external fin.

15. The reactor of claim 14, wherein the external insert, the external fin, or both comprises an external scaffolding element and wherein the external scaffolding element comprises a helical element, an annular element, a studded element, a serrated element, a wire element, a cut helical element, a cut annular element, a wavy helical element, a slotted wavy helical element, a slotted helical element, or a combination comprising one or more of the foregoing.

16. The reactor of claim 4, wherein the catalyst varies in concentration, activity, or both from a feed end of the tube to an outlet end of the tube and wherein the variance is from low activity, concentration, or both at the feed end to a higher activity, concentration, or both, at the outlet end.

17. The reactor of claim 4, wherein the phosgene reactor has a heat transfer area per unit volume of 100 to 10,000 $m^2/m^3$.

* * * * *